Dec. 9, 1958  S. T. SHEARS  2,863,196
ADJUSTABLE BELT FASTENER
Filed July 12, 1956
FIG. 1.
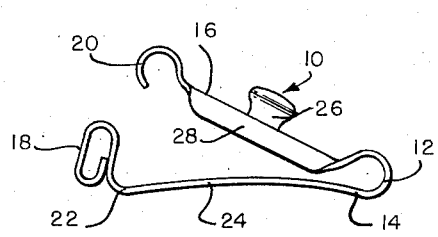
FIG. 2.
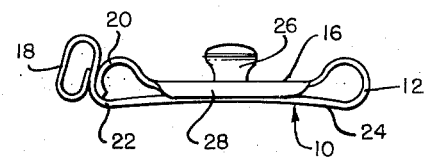
FIG. 3.
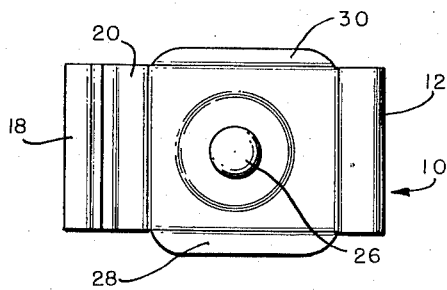
FIG. 4.
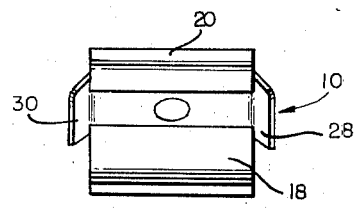
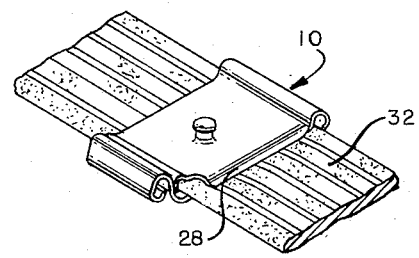
FIG. 5.
INVENTOR
STUART T. SHEARS,
BY Hall & Houghton
ATTORNEY

United States Patent Office 2,863,196
Patented Dec. 9, 1958

2,863,196

ADJUSTABLE BELT FASTENER

Stuart T. Shears, Belmont, Mass., assignor to United-Carr Fastener Corporation, Boston, Mass., a corporation of Delaware Application July 12, 1956, Serial No. 597,555

1 Claim. (Cl. 24—73)

This invention relates to an improved one-piece clasp-fastener or buckle of the type which may be adjustably secured to a strap or the like. More particularly the invention relates to a clasp of the aforesaid type which may be easily fixed at a desired position on a strap, ribbon, or belt without first being threaded thereon.

An exemplary application of the invention is in connection with children's coveralls in which it is necessary to make frequent adjustments of the points at which shoulder straps are fixed to the bib or waist-band so as to accommodate growth. A typical device of the prior art used in this connection has a pair of end loops through which the strap is threaded in succession and a central portion which supports the male part of a stud and socket snap fastener. Such devices are inconvenient to use, because they must be threaded onto the strap, and are not easy to adjust, because the strap must be pulled through the loops. Moreover, they tend to slip, because there is no positive clamping of the strap, particularly where, in an effort to sandardize fastener sizes, the thickness of strap material is less than optimum for the fastener employed.

Accordingly, it is a principal object of the invention to provide a fastener which overcomes the deficiencies of the prior art.

More specifically, it is an object of the invention to provide a fastener which may be fixed positively at any desired location on a strap, which does not require threading onto the strap, and which may be released and engaged quickly and easily.

A further object of the invention is to provide a device of the aforesaid type which may be manufactured simply and economically and which may be adapted by a simple manufacturing adjustment to accommodate widely different thicknesses of strap material.

These and other objects of the invention and the manner in which they are accomplished will become more readily apparent in the following detailed description of the invention taken in conjunction with the accompanying drawing, wherein:

Figure 1 is a side elevation view of a preferred form of the invention shown in its open or disengaged position;

Figure 2 is a similar view of the invention shown closed or engaged;

Figure 3 is a top plan view of the invention shown closed;

Figure 4 is an end elevation view of the invention shown open; and

Figure 5 is a perspective view of the invention shown closed on a strap.

Briefly, the invention comprises a clasp formed integrally with the male part of a stud and socket snap fastener and arranged to releasably clamp a strap.

Referring to the drawing, the clasp comprises a strip 10 of springy material, such as spring steel, which is provided with a large annular fold at 12 to form a long arm 14 and a short arm 16. In the form shown, the long arm 14 is bent back adjacent its free end toward the large annular fold 12 and terminates in a rolled end 18. The bent back part 22 defines a resilient bight. The short arm 16 has its free end curled inwardly as shown at 20 and this curled portion is adapted to snugly fit within and have substantial surface contact with the bight portion 22 as shown in Figure 2. In this figure it may be seen that the curled end of the shorter arm is held under the rolled end of the longer arm to releasably interlock therewith. This construction of the ends of the clasp arms provides a smooth, rounded clasp end, strengthens the locking action of the clasp and at the same time ensures a positive catch which may be easily released. The clasp is closed by pressing the arms together, the arms pivoting about the fold at 12 until they are held fast by the catch provided by the interlocking rolled arm ends. The natural resiliency of the strip material is relied upon to hold the catch releasably closed and to move the arms apart when the catch is opened. The resiliency is accentuated by using a relatively large annular fold at 12 and by bowing the long arm 14 inwardly as indicated at 24.

The short arm is formed integrally with an outwardly extending door knob shaped stud 26, which constitutes the male part of a stud and socket snap fastener. The opposite edges of the short arm are provided with integral flanges 28, 30 which extend obliquely toward the long arm and beyond the corresponding edges thereof.

In the use of the invention, the clasp is simply slipped open end first over a strap, ribbon, or belt, as indicated at 32 in Figure 5, the strap passing easily between the free ends of the open arms. When the proper location of the clasp on the strap has been determined, the clasp is closed as described above. The strap is clamped tightly between the flanges of the short arm 16 and the bowed central portion of the long arm 14. When it is desired to adjust the position of the clasp, it is only necessary to open the clasp by pulling back the rolled end of the long arm 14 and slip the clasp along the strap to the new position, at which it is closed as before. The clasp may be easily removed if desired. The female part of the snap fastener may be attached to the body of a garment or otherwise, as desired.

It will be noted that in the form shown, the mere pressure of the two arms toward each other is not alone relied on to grip the fabric, but rather the snubbing of the fabric across the side edges of the arm 14 by the inclined snubbing flanges 28, 30, the angles of which relative to the plane of the arm 14 are preferably set to tightly snub the fabric over the said edges even before the flat surfaces of the arms fully compress the fabric between them.

The device of the invention may be manufactured simply by industrial cutting, stamping, and bending techniques. It is a simple matter to adjust the bending apparatus to cause the flanges 28 and 30 to be bent at whatever angle is optimum for strap material of particular thicknesses, thereby accommodating a wide range of thicknesses.

While a preferred embodiment of the invention has been shown and described, it will be apparent to those skilled in the art that modifications can be made therein without departing from the principles and spirit of the invention, the scope of which is defined in the appended claim. The foregoing embodiment is thus exemplary, rather than restrictive, and those modifications which lie within the meaning and range of equivalency of the claim are included therein.

What is claimed is:

A clasp of the type described comprising a strip of springy material having a large substantially annular fold to form a pair of arms pivotable toward and away from each other about said large substantially annular fold, one of said arms being longer than the other, said longer arm being bowed inwardly and the said arm, adjacent its free end, being bent back toward the large annular fold and terminating in a forwardly rolled end, said bent back part defining a resilient bight, said shorter arm having its free end portion curled inwardly, said curled end portion adapted to snugly fit within and have substantial surface contact with said bight portion, whereby the curled end of the shorter arm may be held under the rolled end of the longer arm to releasably interlock therewith, the shorter arm having a pair of flanges along its opposite edges, respectively, said flanges extending obliquely towards the longer arm, and extending in the interlocked position of the arms, beyond the corresponding edges of the longer arm, and co-acting with said edges to effect a snubbing action upon a fabric strap clasped between the arms, the flanges of the shorter arm and the bowed central portion of the longer arm being adapted to clamp a fabric strap tightly therebetween.

References Cited in the file of this patent

UNITED STATES PATENTS

| | | |
|---|---|---|
| 600,887 | Pettit | Mar. 22, 1898 |
| 1,342,048 | Hultman | June 1, 1920 |
| 1,444,030 | Leather | Feb. 6, 1923 |
| 1,531,915 | Fitzgerald | Mar. 31, 1925 |
| 1,544,303 | Fellows | June 30, 1925 |
| 1,600,684 | McGibbon | Sept. 21, 1926 |
| 1,607,819 | Edwards | Nov. 23, 1926 |
| 1,781,709 | Spear | Nov. 18, 1930 |

FOREIGN PATENTS

| | | |
|---|---|---|
| 2,260 | Great Britain | 1874 |
| 4,920 | Great Britain | 1882 |